United States Patent [19]

Umetani

[11] Patent Number: 4,789,955
[45] Date of Patent: Dec. 6, 1988

[54] OPERATION UNIT WITH AN ERROR AMOUNT CALCULATING CIRCUIT FOR OUTPUT DATA THEREOF

[75] Inventor: Yukio Umetani, Hachioji, Japan

[73] Assignee: Hitachi, Ltd., Tokyo, Japan

[21] Appl. No.: 860,510

[22] Filed: May 7, 1986

[30] Foreign Application Priority Data

May 10, 1985 [JP] Japan .................................. 60-97768

[51] Int. Cl.$^4$ ............................................. G06F 7/38
[52] U.S. Cl. .................................... 364/745; 364/736; 364/748
[58] Field of Search ............... 364/736, 745, 748, 737, 364/754, 761, 768, 764, 765, 741

[56] References Cited

U.S. PATENT DOCUMENTS 4,562,553 12/1985 Mattedi et al. ...................... 364/745

OTHER PUBLICATIONS

L. H. Thomas, "Round-Off Errors and Machine Comuting", IBM Technical Disclosure Bulletin, vol. 4, No. 11, Apr. 1962, p. 37.

Primary Examiner—Gary V. Harkcom
Assistant Examiner—Long Thanh Nguyen
Attorney, Agent, or Firm—Antonelli, Terry & Wands

[57] ABSTRACT

An operation unit includes a first unit for calculating input data and for outputting an error data indicating an error generated as a result of the calculation by using such a mantissa data at a lower order as has been obtained midway of the calculation but is not used as an output result data; and a second unit for outputting error data of the calculation result data from the first-named error data and error data input accompanying the input data.

7 Claims, 4 Drawing Sheets 4,789,955

OPERATION UNIT WITH AN ERROR AMOUNT CALCULATING CIRCUIT FOR OUTPUT DATA THEREOF

BACKGROUND OF THE INVENTION

The present invention relates to an operation unit for calculating floating point data of a computer and, more particularly, to an operation unit suitable for executing such a scientific technique calculation program described in a high-level language as is suitable for numerical simulation of physical phenomena.

In the execution of such a floating point calculation train, immigration of an error into initial data based on the finiteness of data length, and occurrence, propagation and amplification of a rounding error of each calculation are unavoidable on principle. Hence, evaluation of the error amount for ensuring reliability of the calculation result is indispensable for the numerical calculation.

Here, the evaluation of the error amount is roughly divided into analytic and dynamic methods. Noting the function to solve a calculation train such as a simultaneous linear equation, the analytic method evaluates the error based on a global index such as the number of conditions of a coefficient matrix but does not enter into the detail of the calculation train so that it is convenient and has an excellent prospect. However, the analytic method has its applicable range limited partially to calculations having known functions and properties and has a tendency to make a worse evaluation than the actual one. In most cases, therefore, the dynamic method piling the evaluations while sequentially following the individual processes of the calculation is adopted. In one convenient phase, the dynamic method additionally executes a long precision calculation, in which the data length is doubled, and compares the results. The dynamic method is entangled with problems of explosive increase in the time period and data amount required for the long precision calculation. As methods for avoiding those problems, there are known the "method of giving perturbations to input data and arithmetically intermediate data to observe the influences" and the "method based on partial derivative calculations according to the graph theory". In either method, however, the direction and amount of the perturbations or the error amount occurring in each calculation are statistically assumed. There is still left a problem of a failure in evaluating the actual error for the calculations using the individual data although the dynamic method is proper for evaluating the stability of the calculation method.

SUMMARY OF THE INVENTION

An object of the present invention is to provide an operation unit which has a mechanism for solving those problems in the error evaluation and for making the dynamic evaluation efficient and accurate.

According to the present invention, there is provided an operation unit which comprises: first means for calculating an input data and for outputting an error data indicating an error generated as a result of the calculation by using such a mantissa data at a lower order as has been obtained midway of said calculation but is not used as an output result data; and second means for outputting an error data of said calculation result data from the first-named error data and an error data input accompanying said input data.

DESCRIPTION OF THE PREFERRED EMBODIMENTS

The present invention will be described in the following in connection with the embodiments thereof.

A first description is directed to a linear error approximating equation for operations known per se.

Letters u and v denote input data for addition and substraction; letter w denotes a result data; and letters $\Delta u$, $\Delta v$ and $\Delta w$ denote their accompanying errors. Terms $(u \pm v)$ and so on denote the true results of addition and subtraction, and terms $((u \pm v))$ and so on denote the results obtained through an operation circuit. If $\Delta(u \pm v) \equiv (u \pm v) - ((u \pm v))$ is assumed, then:

$$(u + \Delta u) \pm (v + \Delta v)$$
$$= (u \pm v) + (\Delta u \pm \Delta v)$$
$$= ((u + v)) + \Delta(u \pm v) + ((\Delta u \pm \Delta v)) + \Delta(\Delta u \pm \Delta v).$$

The terms $\Delta(u \pm v)$ and $\Delta(\Delta u \pm \Delta v)$ are errors which are newly generated by the respective calculations. Here, if the term $\Delta(\Delta u \pm \Delta v)$ is neglected, then:

$$= (u \pm v) + \Delta(u \pm v) + ((\Delta u \pm \Delta v)).$$

This equation is equal to $(w + \Delta w)$, and $w = ((u \pm v))$. Hence:

$$\Delta w \approx \Delta(u \pm v) + ((\Delta u \pm \Delta v)) \ldots \quad (1)$$

From this equation, the error of the addition and subtraction can be approximated by the sum of the arithmetic result of the error generated by this calculation and the input error.

Likewise, for the error $\Delta w$ of the result of the multiplication of u and v, the following relationship holds if the term $\Delta u * \Delta v$ (where * denotes a multiplication) is neglected:

$$\Delta w \approx (u * v) + ((\Delta u * v)) + ((u * \Delta v)) \ldots \quad (2)$$

For a division, the following equation holds:

$$(u + \Delta u)/(v + \Delta v) = (u + \Delta u)(v - \Delta v)/(v + \Delta v)(v - \Delta v)$$
$$= (u * v + \Delta u * v - u * \Delta v - \Delta u * \Delta v)/(v^2 - (\Delta v)^2)$$
$$= (u * v + \Delta u * v - u * \Delta v)/v^2$$

$$= u/v + \Delta u/v - u \cdot \Delta v/v^2$$

$$= ((u/v)) + \Delta v(u/v) + \Delta u/v - u \cdot \Delta v/v^2.$$

From this equation, the following equation holds:

$$\Delta w = \Delta(u/v) + 1/v((\Delta u - u \cdot \Delta v/v))$$

In the present invention, the error evaluations are superposed in accordance with the calculating processes by using this approximating equation. For the initial data, a truncating/rounding error using the format change when a zero or data is inputted is placed.

In the following embodiment, the input operand data u and v and the arithmetic result data w are floating point data each of which is composed of a symbol part of 1 bit, an exponent part of 7 bits and a mantissa part of 56 bits, whereas the input error data $\Delta u$ and $\Delta v$ and the output error data $\Delta w$ are floating point data each of which is composed of a symbol part of 1 bit, an exponent part of 7 bits and a mantissa part of 8 bits.

Figure 1A:
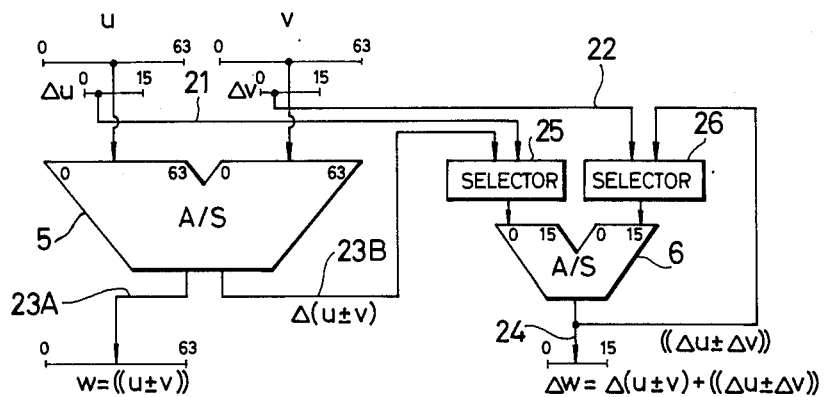
FIG. 1A shows one embodiment of an operation unit for addition or subtraction according to the present invention.

FIG. 1A is a block diagram showing an operation unit for addition and subtraction. Reference numeral 5 denotes a main adder/subtracter having a 64-bit width, and numeral 6 denotes an auxiliary adder/subtracter having a 16-bit width for error evaluation. The difference between the main adder/subtracter 5 and the auxiliary adder/subtracter 6 resides in the bit width of the mantissa part such that the input/output data of the main adder/subtracter 5 has a symbol part of 1 bit, a exponent part of 7 bits and an mantissa part of 56 bits, whereas the auxiliary adder/subtracter 6 has a symbol part of 1 bit, a mantissa part of 7 bits and an exponent part of 8 bits. This applies to other embodiments, as will be described with reference to FIGS. 1B and 1C. The main adder/subtracter 5 is constructed such that it conducts an addition or subtraction of the two arithmetic data u and v inputted to output the arithmetic result data $w = ((u+v))$ (or $((u-v))$) to a line 23A and a rounded error $\Delta(u \pm v)$ in the addition or subtraction to a line 23B. This construction will be described in detail hereinafter with reference FIG. 2A. In parallel with the addition or substraction (which will be called the main calculation) in the main adder/subtracter 5, the error data $\Delta u$ and $\Delta v$ inputted as the error data accompanying the calculation data u and v through lines 21 and 22, respectively, are selected by selectors 25 and 26 and are added (or subtracted) by the auxiliary adder/subtracter 6 so that the intermediate error data $((\Delta u + \Delta v))$ (or $((\Delta u - \Delta v))$) are outputted to a line 24. After this, simultaneously with the end of the main calculation, the rounded error $\Delta(u \pm v)$ obtained on the line 23B and the intermediate result $((\Delta u \pm \Delta v))$ obtained on the line 24 are selected by the selectors 25 and 26 so that their addition (or subtraction) is executed by the auxiliary adder/subtracter 6 until the final error data $\Delta w$ expressed by the equation (1) is outputted to the line 24.

What is executed after the end of the main calculation is limited to $\Delta(u+v) + ((\Delta u \pm \Delta v))$, and the auxiliary adder/subtracter 6 has about a one-fifth scale of the main adder/subtracter 5 and a far shorter calculation time than that of the main adder/subtracter 5. Therefore, a high-speed error calculation is realized by adding a small amount of circuit.

Figure 2A:
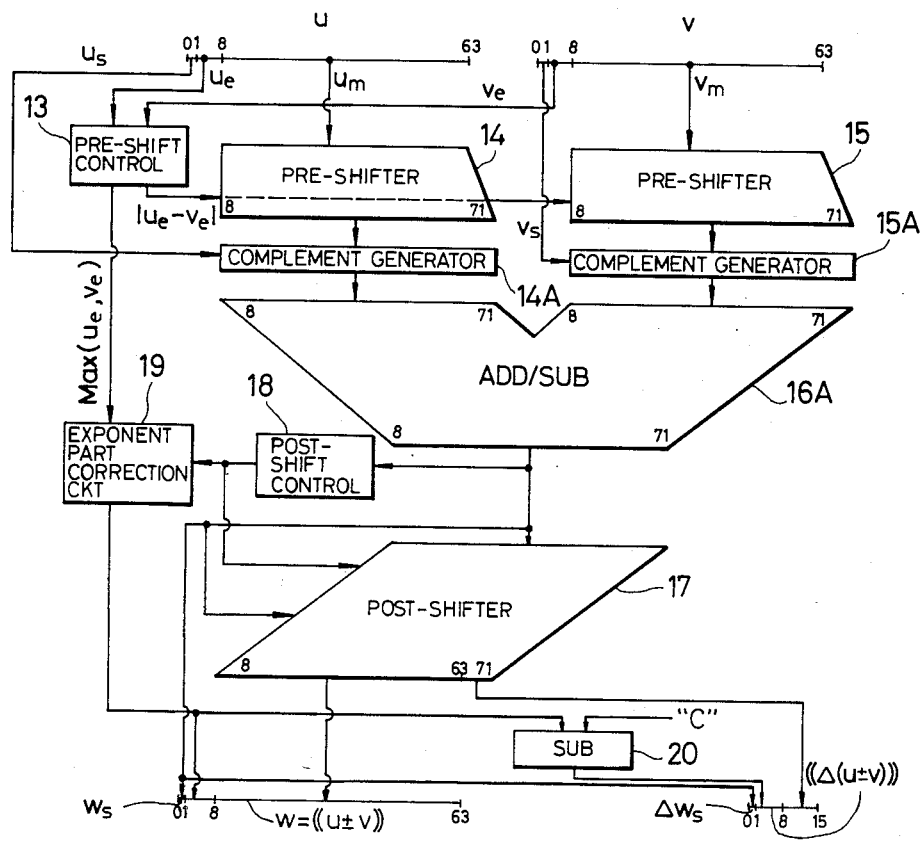
FIG. 2A is a block diagram showing a main addition and subtraction device to be used in the operation unit of FIG. 1A.

As shown in FIG. 2A, the main adder/subtracter 5 is composed of: pre-shifters 14 and 15 for shifting the mantissa parts $u_m$ and $v_m$ of the data u and v, respectively; a pre-shift control 13 made receptive of the exponent parts $u_e$ and $v_e$ of the data u and v to control the amounts shifted by the pre-shifters 14 and 15; complementary number generation circuits 14A and 15A for complementing the outputs of the pre-shifters in accordance with the symbol bits $u_s$ and $v_s$; an adder/subtracter 16A for adding or subtracting the outputs of the complementary number generation circuits 14A and 15A; a post-shifter 17 for shifting the output of the adder/subtracter 16A; a post-shift control 18 for controlling the shifted amount of the post-shifter 17; an exponent part correction circuit 19; and a shift circuit 20 for shifting the exponent parts which are corrected by the correction circuit 19.

The main adder/subtracter 5 thus composed is similar to the adder/subtracter of the prior art except the components denoted by reference numerals 17 and 18.

For digital registration of the arithmetic data u and v, the pre-shift control 13 feeds the absolute value $|u_e - v_e|$, which is deduced by subtracting the smaller one of the exponents $u_e$ and $v_e$ of the data u and v from the larger one, as a rightward shift amount to the pre-shifter (e.g., 15) corresponding to the data (e.g., $v_e$) having a smaller exponent part and feeds the data (e.g. $u_e$) having the larger exponent part to the exponent part correction circuit 19. One of the mantissa parts $u_m$ and $v_m$ is shifted by the pre-shifter 14 or 15.

In the present embodiment, the input data of the pre-shifters 14 and 15 has a bit width of 56 bits whereas the output data has a bit width of 64 bits, 8 bits larger than that of the input data.

The outputs of the pre-shifters 14 and 15 are inputted to the complementary number generation circuits 14A and 15A so that a complementary number of 2 is obtained in case the symbol bits $u_s$ and $v_s$ are at 1.

The adder/subtracter 16A receives the outputs of 64 bits of the complementary number generation circuits 14A and 15A to output the data of 64 bits and the symbol value as a result of its addition or subtraction. In order to normalize these outputs, the post-shift control 18 detects whether or not the digit 0 is present in the head of the output data, if the symbol value of the result is 0, and whether or not the digit 1 is present if the symbol value of the result is 1. If YES, the post-shift control 18 outputs the digit number as the leftward shift amount to the post-shifter 17 and the exponent part correction circuit 19. This exponent shift correction circuit 19 subtracts this leftward shift amount from the maximum exponent data outputted from the pre-shift control 13 to output the result as the exponent part data of the arithmetic result. On the other hand, the post-shifter 17 shifts the output of the adder/subtracter 16A leftward in accordance with the leftward shift amount outputted from the post-shift control 18 to output it as the data of 64 bits. At this time, if the symbol of the result is 1 (negative), the operation to complement the data again and to transform the complementary number into the expression of an absolute value is conducted at the same time.

The output data $((u \pm v))$ of the main adder/subtracter 5 is composed of a symbol part of 1 bit of the result, an exponent part of 7 bits of the output of the exponent part correction circuit 19, and a mantissa part of upper 56 bits of the output of the post-shifter 17.

The lower 8 bits of the post-shifter are used as the mantissa part of the rounded error $\Delta(u+v)$ of that main adder/subtracter 5. The exponent part of that rounded error is equal to the subtraction of a constant "C" indicating the digit number of the exponent data corresponding to the digit length of the exponent part of the arithmetic result data from the output of the exponent part correction circuit 19. The subtracter 20 is provided for carrying out that subtraction.

Thus, the calculation data ((u+v)) and its error $\Delta(u+v)$ generated during the calculation of the former are obtained. In the adder/subtracter of the prior art, the output of the post-shifter 17 is limited to 56 bits, and the rounded error part used in the present embodiment is not outputted. In the present embodiment, however, the post-shifter 17 is constructed to output that part, and the rounded error can be calculated by calculating the exponent of the error part at the subtracter 20.

Figure 1B:
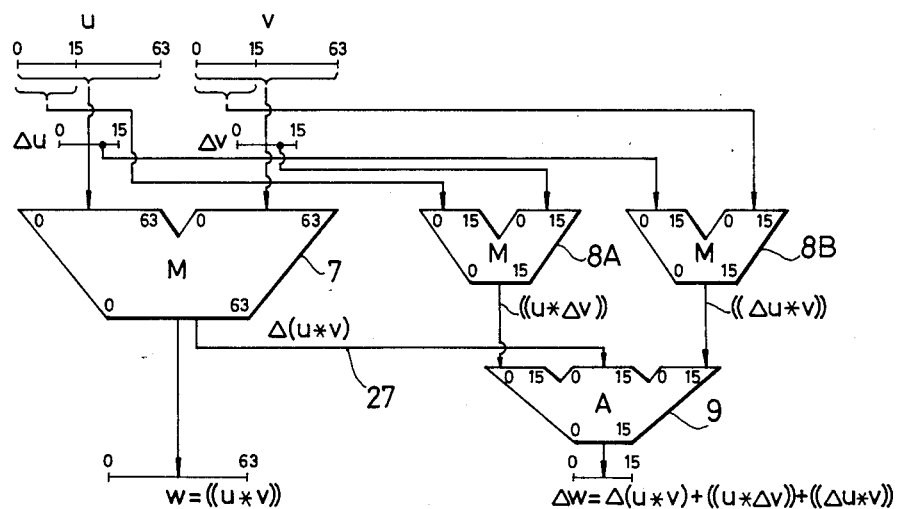
FIG. 1B shows one embodiment of an operation unit for multiplication according to the present invention.

FIG. 1B is a block diagram showing an operation unit for multiplication according to the present invention. Reference numeral 7 denotes a main multiplier having a width of 64 bits, which is constructed to output the product of $w = u * v$ of the data u and v and its error $\Delta(u * v)$ during the calculation of the product of the former; numerals 8A and 8B denote auxiliary multipliers having a width of 16 bits for error evaluation; and numeral 9 denotes a 3-input adder having a width of 16 bits. In parallel with the multiplication of the main multiplier 7, by using the auxiliary multipliers 8A and 8B, the product of $u * \Delta v$ of the data u and $\Delta v$ and the input error data $\Delta u$ are determined by using the 8 bits of the exponent part and the upper 8 bits of the mantissa part of the input data u, and the product $\Delta u * v$ of the data $\Delta u$ and v is determined by using the 8 bits of the exponent part and the upper 8 bits of the mantissa part of the input data v. Then, those results $u * \Delta v$ and $\Delta u * v$ and the rounded error $\Delta(u * v)$ obtained on a line 27 at the end of the main multiplication are added by using the 3-input adder 9 to obtain the resultant error value $\Delta w$. The auxiliary multipliers 8A and 8B and the adder 9 can be realized in a circuit scale of one-tenth as large as or smaller than that of the main multiplier 7, and what operates after the end of the main calculation is limited to the adder 9. As a result, the high-speed error calculation is executed.

Figure 2B:
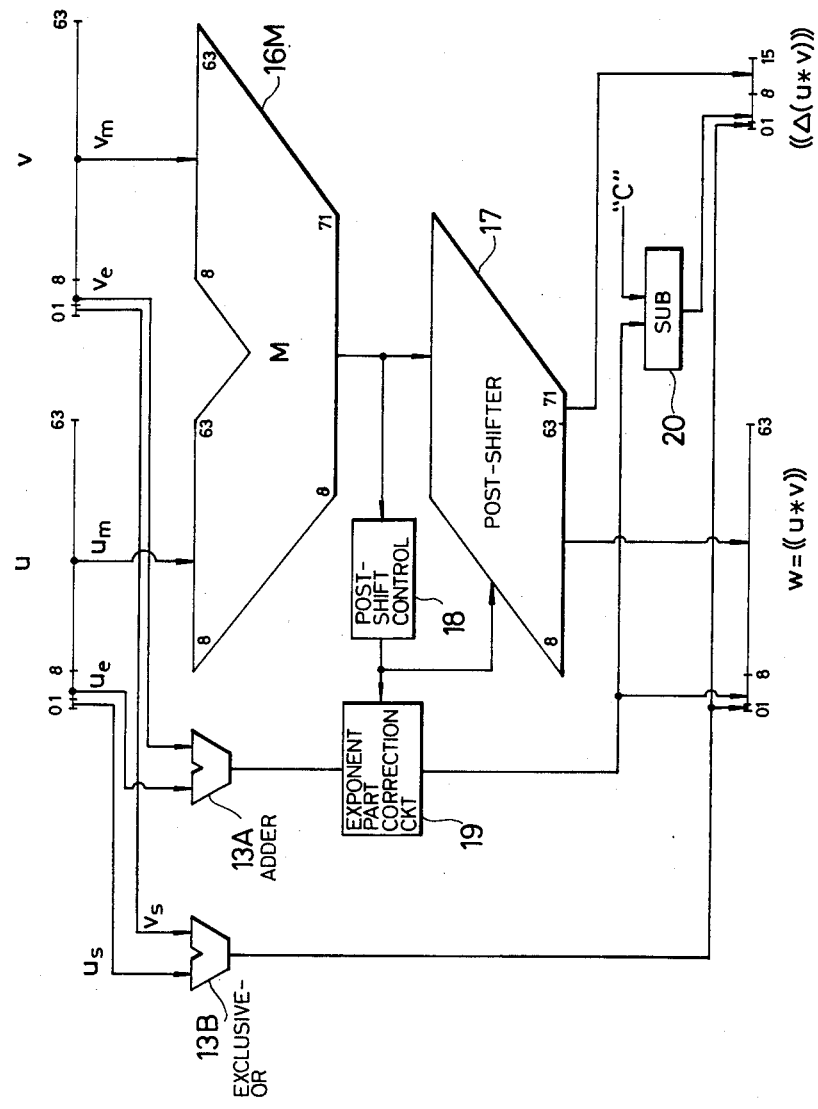
FIG. 2B is a block diagram showing a main multiplication device to be used in the operation unit of FIG. 1B.

FIG. 2B is a block diagram showing the main multiplier 7. Reference numeral 16M denotes a circuit for multiplying the mantissa parts $u_m$ and $v_m$, which receives the data $u_m$ and $v_m$ of 56 bits to calculate the multiplied value of 64 bits. By this multiplied value, the same post-shift control 18 as that of FIG. 2A detects the post-shift number, and the post-shifter 17 shifts the multiplied value leftward by that shift number to output the data of 64 bits. After this post-shift, the upper 56 bits are sent out as the mantissa part of the arithmetic result w, and the lower 8 bits are sent out as the mantissa part of the rounded error.

The exponent parts $u_e$ and $v_e$ of the input data u and v are added by a 7-bit adder 13A. After this, the post-shift number outputtted from the post-shift control 18 is subtracted from the result of addition. The constant C is subtracted from the result of subtraction by the subtracter 20. This result is outputted as the exponent part of the error $((\Delta(u * v)))$ generated by the calculation. The constant C denotes the number of digits of the exponent of the bit length "5638 of the mantissa part like the case of FIG. 2A.

The symbol parts $u_s$ and $v_s$ of the input data u and v are inputted to an exclusive OR circuit 13B, and the symbols of the result obtained are set in the symbol parts w and $\Delta w$.

Figure 1C:
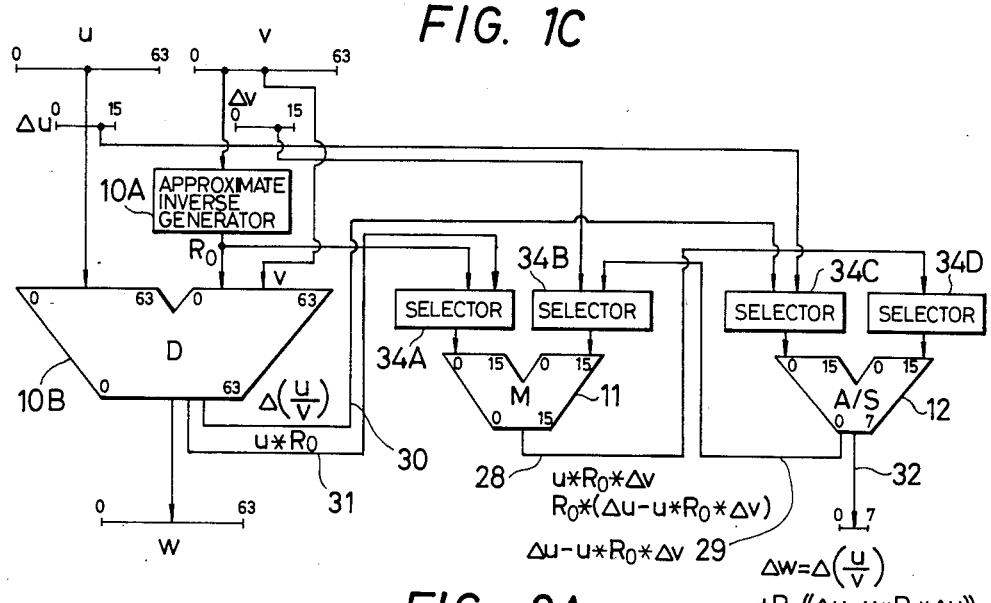
FIG. 1C shows one embodiment of an operation unit for division according to the present invention.

FIG. 1C is a block diagram showing an operation unit for division according to the present invention. Reference numeral 10A denotes an approximate inverse generator; numeral 10B denotes a main divider having a width of 64 bits; and numerals 11 and 12 denote an auxiliary multiplier and an adder/subtracter having a width of 16 bits for error evaluation. In the error equation (3), an inverse approximating value $R_0$ is used in place of $1/v$, and the evaluation is conducted by the following equation:

$$\Delta w = \Delta(u/v) + R_0((\Delta u - u * R_0 * \Delta v)).$$

Specifically, the approximate inverse $R_0$ of the divisor v is determined by the circuit 10A, and the quotient w of the dividend u and the divisor v is determined from that inverse $R_0$ and the dividend u by the main divider 10B. This main divider 10B is constructed to output the product $uR_0$ of the inverse $R_0$ and the dividend u and the calculation error $\Delta(u/v)$ to the lines 31 and 30, respectively. By selecting the 8 bits of the exponent part and the 8 bits of the mantissa part of the data $u \times R_0$ by a selector 34A and by selecting the data $\Delta v$ by a selector 34B, the multiplication of the data $u * R_0$ and $\Delta v$ is executed by the auxiliary multiplier 11 so that the resultant data $u * R_0 * \Delta v$ of 16 bits is outputted to a line 28. By selecting the data $\Delta u$ and the aforementioned resultant data $u * R_0 * \Delta v$ by selectors 34C and 34D, respectively, those data are subjected to a subtraction in the adder/subtracter 12 so that data $\Delta u - u * R_0 * \Delta v$ is outputted onto a line 29. By selecting this data and the data $R_0$ outputted from the approximate inverse generator 10A by the selectors 34B and 34A, respectively, the product $R_0 * (\Delta u - u * R_0 * \Delta v)$ of those data is outputted to the line 28 by the multiplier 11. By selecting this product data and the error data $\Delta(u/v)$ outputted by the main multiplier 10B to a line 30 by the selectors 30D and 30C, respectively, those data are added to the adder/subtracter 12 to produce the final error data $\Delta w$.

Since the circuit scales of the operation units 11 and 12 are one-twentieth or less as large as that of the main operation unit and since what is executed after the end of the main calculation is limited to the final addition, an increase in the operation time by the error evaluation is slight.

Figure 2C:
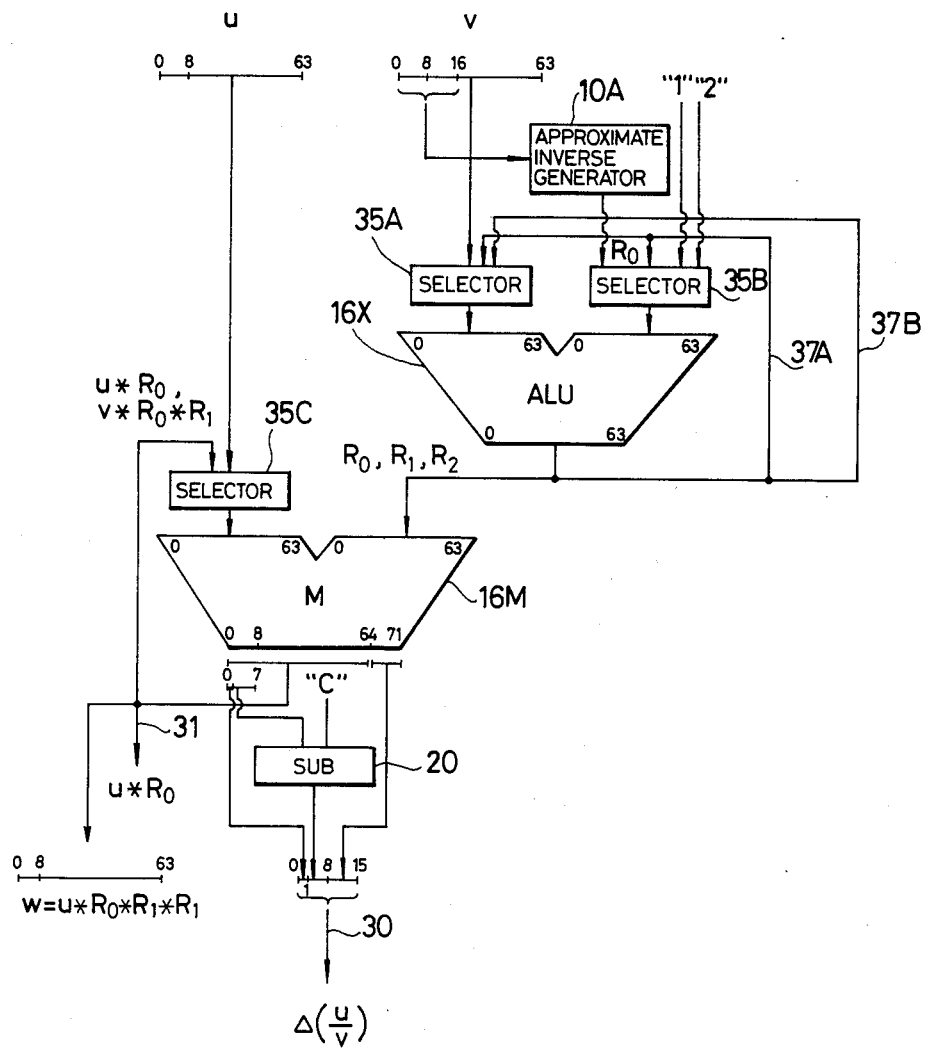
FIG. 2C is a block diagram showing a main division device to be used in the operation unit of FIG. 1C.

FIG. 2C shows one example of the construction of the main divider 10B. An operation unit 16X has adding, subtracting and multiplying functions. A selector 35A selects the input data u and the outputs 37A and 37B of the operation unit 16X to send the selected one to the operation unit 16X. A selector 35B selects the approximate inverse $R_0$ outputted from the approximate inverse generator 10A, the output 37A of the operation unit 16X and the input data "1" and "2" to send the selected one to the operation unit 16X. Those selectors 35A and 35B and the operation unit 16X are controlled to output the approximate inverse $R_0$ through the operation unit 16X. Then, $R_1 = 1 + (1 - v * R_0) + (1 - v * R_0)^2$, and $R_2 = 2 - v * R_0 * R_1$ are sequentially calculated by the operation unit 16X and are sent to a multiplier 16M. The data u is first selected by a selector 35C, and the product $u * R_0$ is determined by the multiplier 16M. After this, the upper 64 bits of the output of the multiplier 16M are selected by the sector 35C and are sequentially multiplied by $R_1$ and $R_2$. Thus, $w = u * R_0 * R_1 * R_2$ is obtained. The multiplier 16M is constructed to determined the length of the mantissa part in the accuracy of 64 bits so as to determined the error $\Delta(u/v)$. As a result, the output bit width has 72 bits. Of these, the upper 64 bits are utilized as the data of u * $R_0$, u * $R_0$ * $R_1$ or u * $R_0$ * $R_1$ * $B_2$. On the other hand, the product u * $R_0$ is to the multiplier 28 (as shown in FIG. 1C) through a line 31.

Of the output of the multiplier 16M, the lower 8 bits are utilized as the mantissa part of the error data $\Delta(u/v)$ generated by the division. The mantissa part of this error data is equal to the result which is determiend by subtracting the constant "C" from the exponent part of the multiplier 16M by the subtracter 20. The constant "C" is identical to that which has been described with reference to FIG. 2A. The multiplier 16M is constructed by eliminating the subtracter 20 from the multiplier of FIG. 2B and by outputting the lowermost 8 bits of the output of the post-shifter 19-4 and the output w as the bits 64 to 71 and 0 to 63 of the multiplier 16M of FIG. 2C.

Thus, even in the division, the rounded error can be calculated with neither any substantial addition of the circuit nor any augmentation of the arithmetic time period.

What is claimed is:

1. An operation unit comprising:
    first means for executing a first calculation for operand data of floating point indication inputted to generate arithmetic result data having a mantissa part of first bit length and arithmetic error data having a mantissa part of second bit length and indicating an error generated by said calculation; and
    second means connected with said first means for performing a second calculation on both said arithmetic error data and an input error data indicating an error accompanying said input operand data to calculate final error data accompanying said arithmetic result data.

2. An operation unit according to claim 1, wherein said first means includes first adding means for executing addition of first and second input operand data as said first calculation to output addition result data and arithmetic error data generated by said addition, and wherein said second means includes second adding means for executing addition of first and second input error data inputted as errors respectively accompanying said first and second input operand data and said arithmetic error data to calculate final error data accompanying the addition result data.

3. An operation unit according to claim 2, wherein said first adding means includes:
    pre-shift control means responsive to exponent parts of said first and second input operand data for outputting a pre-shift number required to register said exponent parts and for outputting an exponent part of one of said first and second input operand data;
    pre-shift means connected with said pre-shift control means for shifting a mantissa part of the other of said first and second input operand data by an amount dependent on said pre-shifted number;
    first airthmetic means connected with said pre-shift means for performing an addition operation on the shifted mantissa part and a mantissa part of the one input operand data to output a calculation result of third bit length which is a sum of the first and second bit length;
    post-shift control means connected with an output of said first arithmetic means for detecting a post-shift number required to normalize the calculation result of said first arithmetic means;
    post-shift means connected with said first arithmetic means and said post-shift control means for shifting the calculation result of said first arithmetic means in response to said post-shift number detected;
    second arithmetic means connected with said pre-shift control means and said post-shift control means for subtracting a number determined according to said detected post-shift number from the exponent part of said one input operand data; and
    third arithmetic means connected with said second arithmetic means for subtracting a predetermined value indicating said second bit length from an output of said second arithmetic means,
    wherein said first adding means outputs data which has a mantissa part composed of an upper part of the first bit length of data outputted from said post-shift means and an exponent part composed of data outputted from said second arithmetic means, as the addition result data and wherein said first adding means outputs data which has a mantissa part composed of a lower part of the second bit length of the data outputted from said post-shift means and an exponent part composed of output data of said third arithmetic means, as said arithmetic error data generated by said addition.

4. An operation unit according to claim 1, wherein said first means includes first multiplying means for multiplying first and second input operand data to output multiplication result data and arithmetic error data generated by said multiplication; and wherein said second means includes: second multiplying means for multiplying first input error data inputed as error data accompanying said first operand data and said second operand data;
    third multiplying means for multiplying second input error data inputted as error data accompanying said second operand data to said first operand data; and
    adding means connected with said second and third multiplying means and said first means for adding outputs of said second and third multiplying means and said calculation error data to output final error data accompanying said multiplication result data.

5. An operation unit according to claim 4, wherein said first means includes: first arithmetic means for multiplying mantissa parts of said first and second input operand data to output a multiplication result of first bit length; second arithmetic means for determining a sum of exponent parts of said first and second input operand data; post-shift control means connected with an output of said first arithmetic means for detecting a post-shift number required to normalize the output of said first arithmetic means; post-shift means connected with said first arithmetic means and said post-shift control means for shifting the output of said first arithmetic means in response to said shift number detected; third arithmetic means connected with said second arithmetic means and said post-shift control means for subtracting a number determined in accordance with said shift number from the sum of said exponent parts; and fourth arithmetic means connected with said third arithmetic means for subtracting a predetermined value indicating a number corresponding to said second bit length from an output of said third arithmetic means, wherein said first means outputs data which has a mantissa part composed of an upper part of said first bit length of data outputted from said post-shift means and an exponent part composed of data outputted from said third arithmetic means, as multiplication result data from said first and second operand data and wherein said first means outputs data which has a mantissa part composed of a lower part of the second bit length of the data outputted from said post-shift means and an exponent part composed of output data of said fourth arithmetic means, as said arithmetic error data generated by the multiplication.

6. An operation unit according to claim 1, wherein said first means includes: dividing means responsive to first and second input operand data for outputting linear approximate inverse data of the first input operand data, for outputting division result data which is obtained by dividing said second input operand data by said first input operand data, for outputting a product data of said linear approximate inverse data and said second input operand data and for outputting arithmetic error data generated by said division, and wherein said second means includes: first multiplying means connected with said dividing means; adding/subtracting means connected with said first multiplying means; and means for first supplying said first multiplying means with both said product data outputted from said dividing means and a first input error data inputted as data indicating an error accompanying said first input operand data, to calculate another product data, and for supplying said adding/subtracting means with both second input error data inputted as data indicating an error accompanying said second input operand data and the another product provided by said first multiplying means, to calculate a difference therebetween, for secondly supplying said first multiplying means with both the difference provided by said adding/subtracting means and said approximate inverse data to calculate a further another product, and for thirdly supplying said adding/subtracting means with said further another product and said arithmetic error data outputted from said dividing means to calculate a sum thereof as final error data accompanying the division result data.

7. An operation unit according to claim 6, wherein said dividing means includes: means responsive to the first input operand data for outputting the linear approximate inverse data; arithmetic means responsive to said first input operand data and said linear approximate inverse data for sequentially outputting one or plural approximate inverse values for said first operand data; second multiplying means connected with said arithmetic means for cumulatively multiplying said second input operand data by said linear approximate inverse data and said one or plural approximate inverses to output the product of said linear approximate inverse and said second input operand data and to output a cumulative product result to be used as a final division result of said first input data and said linear approximate inverse data and said one or plural approximate inverse of the former and the latter products each including a mantissa part comprised of an upper part of said first bit length within a mantissa part of an output of said second multiplying operation and means for outputting said arithmetic error data from both an exponent part of data outputted from said second multiplying means and a lower part of said second bit length of a mantissa part by said second multiplying means.

* * * * *